United States Patent [19]

Honigsbaum

[11] 4,261,655
[45] Apr. 14, 1981

[54] BIOMECHANICALLY FOCUSED EYEGLASSES

[76] Inventor: Richard F. Honigsbaum, 21 A Barry Gardens, Passaic, N.J. 07055

[21] Appl. No.: 868,074

[22] Filed: Jan. 9, 1978

[51] Int. Cl.³ .................. A61B 3/14; G03B 1/00; G02B 1/06
[52] U.S. Cl. .......................... 351/41; 351/7; 351/168; 350/419
[58] Field of Search .......... 351/41, 159, 168, 169; 350/179, 180; 46/1 F

[56] References Cited

U.S. PATENT DOCUMENTS

| | | | |
|---|---|---|---|
| 2,300,251 | 10/1942 | Flint | 351/169 |
| 3,598,479 | 8/1971 | Wright | 351/41 X |
| 3,614,215 | 10/1971 | Mackta | 351/41 |
| 4,181,408 | 1/1980 | Senders | 351/7 |

OTHER PUBLICATIONS

Robert Graham, "A variable focus lens and its uses," JOSA, Jul. 23, 1940.

*Primary Examiner*—John K. Corbin
*Assistant Examiner*—Rodney B. Bovernick
*Attorney, Agent, or Firm*—Hubbell, Cohen, Stiefel & Gross

[57] ABSTRACT

Improved biomechanically focused eyeglasses for facial wear comprise a frame, adjustable focus lenses, means for securing the lenses to the frame, means for adjusting the focus of the lenses, and means for actuating the adjusting means in response to a voluntary anatomical action which does not involve the hands. In an embodiment wherein the adjustable focus lenses comprise liquid filled cells, each having an elastic surface, means for equalizing the fluid volumes which effect focus of the cells is disclosed. An improved variable focus lens is also disclosed.

11 Claims, 6 Drawing Figures

BIOMECHANICALLY FOCUSED EYEGLASSES

BACKGROUND OF THE INVENTION

1. Field of the Invention

This invention pertains to eyeglasses and more particularly to eyeglasses incorporating adjustable focus lenses. Most particularly, this invention pertains to eyeglasses of the type described wherein focus is effected biomechanically.

2. Statement of the Prior Art

Adjustable curvature lenses for accommodating adjustable focus are known in the art. As disclosed in the November, 1940 issue of the Journal of the Optical Society of America (JOSA), adjustable focus lenses generally take one of two forms. In one, two thin spherical segments are held together at their peripheries and the cavity therebetween filled with a clear liquid. By compressing the spherical segments at their peripheries, say by means of a retaining ring, the curvature, and hence the focal length, of the lenses may be varied. The other disclosed embodiment is similar in construction to the first except that the focal length of the lens is varied by controlling the fluid pressure in the cavity. Fluid lenses of the type described in the JOSA article and applications therefor may be found in U.S. Pat. Nos. 2,300,251, 2,836,101, 3,588,235 and 3,641,354. Such lenses have been proposed for opthalmic correction, particularly as an aid for persons suffering from presbyopia, the age-related inability to focus on objects in the near visual field.

Following present practice, persons suffering from presbyopia are fitted with reading glasses. While satisfactory for their intended purposes, such glasses must be removed to perform visual tasks beyond the reading range. Dual focus lenses have been substituted to avoid this inconvenience, the user selecting the near or far focus portion of the lenses by appropriate head tilt. Where correction for additional viewing distances is required, trifocal lenses have been used. While such multi-zone lenses are convenient for their intended tasks, such arrangements are inconvenient or worse when the position of the object necessitates uncomfortable or impossible head tilt angles. Recognizing this deficiency, Allen, U.S. Pat. No. 3,365,263, proposed a manually controlled inflatable nose pad disposed beneath the bridge of conventional bifocals for raising and lowering the frame and lenses. However, this device is quite cumbersome and, in any event, does not overcome the focusing limits inherent in fixed focused lenses.

One suggested solution to these problems is disclosed in Wright's U.S. Pat. No. 3,598,479 which reveals a pair of eyeglasses incorporating adjustable focus fluid lenses. More particularly, each lens of Wright's eyeglasses defines a flexible liquid-filled cell which communicates with a common finger operated pump control located on the frame. Thus, by manually operating the pump, the liquid pressure in the cells is elevated, and the resulting flexing of the cells increases the curvature of the lenses.

Unfortunately, Wright's principal feature, an adjustable focus lens centered in the optical field of each eye, is rendered a burden by the "hands-on" focusing arrangement which requires attention not only when visual tasks change, but also to accommodate changes in focus resulting from changes in temperature, etc. This burden is, of course, compounded when hands are otherwise occupied, dirty, wet, gloved, etc. Another disadvantage of Wright's eyeglasses results from equalizing cell pressures in an attempt to effect corresponding focus of both lenses. Such equalization ignores differences in the pressure response of the resilient members resulting from age, manufacturing differences, environmental effects, etc, and results in unacceptable differences in the focal lengths of the respective lenses.

SUMMARY OF THE INVENTION

According to the present invention, I have developed a pair of biomechanically focused eyeglasses which overcome these disadvantages of the prior art.

In the preferred embodiment, each lens assembly comprises a membrane cemented or otherwise secured between two conventional transparent rigid plastic lenses, thus defining a pair of cavities, one between each surface of the membrane and the corresponding interior surface of the rigid lens. During manufacture, the distal cavity of each lens is filled with a suitable fluid such as an inert gas, and sealed. The other cavity communicates with the periphery of its defining rigid lens through a suitable duct.

A pair of bellows, one for each lens, is disposed on the interior face of the frame on either side of the upper portion of the bridge. Each bellows is threadably secured to the frame and communicates with a duct in the frame which, in turn, communicates with the duct in the associated lens. The bellows, ducts, and communicating cavities are filled with a transparent fluid refracting medium such as a glycerol and water mixture.

An equalizer bar is secured to the frame over the bellows. The bar preferably has upwardly extending leg portions on either side thereof and is secured to the frame for pivotal motion. This is desirably accomplished by securing the top of the legs about a pair of pins which are threadably secured to the top of the frame on either side of the bridge. A winged brow lever is secured to the frame in overlying relation with the equalizer bar such that movement of the lever will pivot the equalizer bar for controlling operation of the bellows. Preferably, the brow lever is secured to the frame by pivotally securing the wings about the pins such that the brow lever pivots about the same axis as the equalizer bar. The wings of the brow lever extend upwardly and inwardly from the frame, and are shaped and fitted to rest comfortably at the eyebrow ridge, preferably just beneath the wearer's eyebrows.

Thus, lens focus is accomplished by brow movement which pivots the brow lever and hence the equalizer bar, the latter effecting equal compression and accommodating equal relaxation of both bellows. This compression and relaxation of the bellows in turn controls the volume of liquid in the communicating cavities and hence the curvature and the focus of the lenses. Thus, the disclosed arrangement permits automatic focusing without the use of hands. Moreover, the preferred novel focusing mechanism also insures that the focal lengths of both lenses are the same despite differences in membrane flexibility because focusing is effected by simultaneously displacing equal volumes of fluid.

In the preferred embodiment, means are included for adjusting the "rest focal length" of the eyeglasses, that is, the focal length of the lenses when the brow is relaxed. Such means may comprise, for example, a threaded stud secured to the central portion of the equalizer bar and a knurled thumbwheel threadably received on the stud between the equalizer bar and the brow lever. Rotation of the thumbwheel adjusts the relative spacing between the equalizer bar and the brow lever and thus the "rest focal length" to suit the wearer.

A number of modifications to the preferred biomechanically focused eyeglasses may be made. For example, the rigid lenses on either side of the membrane may be shaped to correct both myopia and hyperopia as well as to effect cylindrical and prismatic correction. Also, focusing may be effected by other head muscles, or by using suitable nerve or muscle signals to trigger externally powered focusing mechanisms. Obviously, whatever form of anatomical action is used to effect focusing, it must avoid the use of hands and the resulting disadvantages of the prior art, and must be voluntary so that focus can be effected as desired. Other variations include the use of alternative fluid lenses, the use of rigid element "zoom" lenses, pivoting the brow lever and equalizer bar about different axes, securing the brow lever to the frame for translation rather than pivoting, replacing the bellows with piston-cylinder arrangements, and offsetting the optical center of the liquid lenses from the geometric center of the rigid lenses. While a single bellows arrangement may be employed, the somewhat more complex arrangement described above is preferred because, as already noted, it insures that both lenses will have substantially the same focal length despite differences in respective membranes. It is, of course, possible to substitute arrangements accommodating individual lens focusing where different focal lengths are needed.

Further refinements include counterbalance arrangements such as those in which springs are introduced into the focusing system, say between the equalizer bar and the frame, or within or as part of the bellows, and adjustable focus lenses whose optical axes also converge or diverge to accommodate binocular viewing at extremely close range.

I have also developed a novel adjustable focus lens which may be substituted for the liquid lens arrangement described above. The lens includes a closed, fluid filled elastic cell supported in tension, preferably by a plurality of coplanar elastic strands secured at one end to the cell and at the other end to a suitable retaining means, such as a substantially rigid ring concentric with the cell. The lens also includes a radially resilient toroidal member preferably secured to the strands and concentric with the cell. The toroidal member communicates with conventional bellows through a suitable conduit or feeder, bellows, conduit and feeder being filled with a suitable fluid and sealed.

It will thus be apparent that compression of the bellows will increase the volume of fluid in the toroidal member, decreasing its major diameter and reducing the forces applied to the cell by the elastic strands. With external forces reduced, cell walls will relax, curvature will increase, and focal length will be decreased. Clearly, relaxing the bellows will have the opposite effect.

One advantage of this lens over prior art variable focus fluid lenses is that the fluid within the cell is both isolated and fixed. Thus, flow turbulence and the resulting visual distortion caused by the ingress and egress of fluids during focus is eliminated. Furthermore, the volume change required to effect the sphincter action is small in comparison to the volume change required to effect an equivalent focus change where focus is effected on the basis of fluid volume displacement within the cell. Consequently, focusing effort is reduced.

These and other changes, modifications, and advantages of both the biomechanically focused glasses and the novel fluid lens will be more fully appreciated from the following detailed description and annexed drawings of the preferred embodiments thereof.

DETAILED DESCRIPTION OF THE PREFERRED EMBODIMENTS

Figure 1:
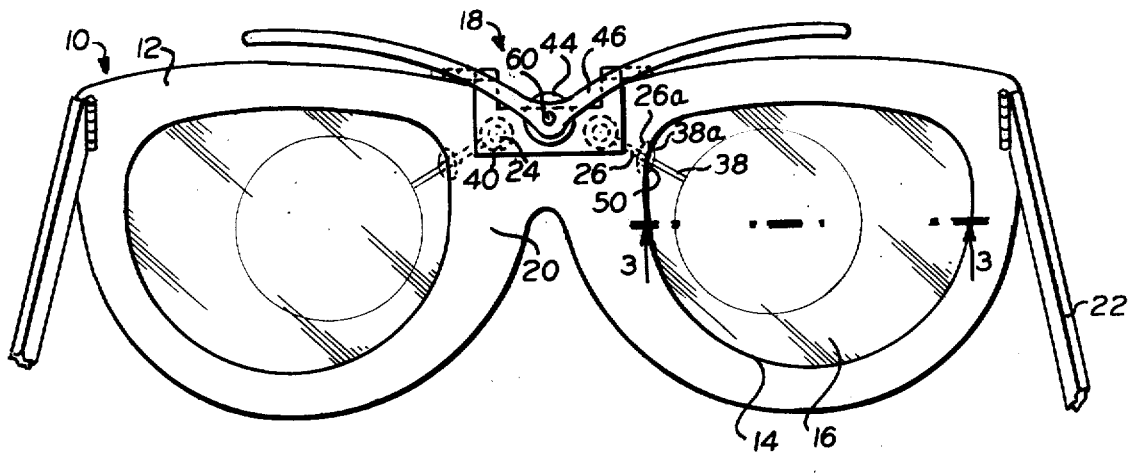
FIG. 1 is a fragmentary perspective view of the preferred biomechanically focused eyeglasses according to the present invention.
Figure 2:
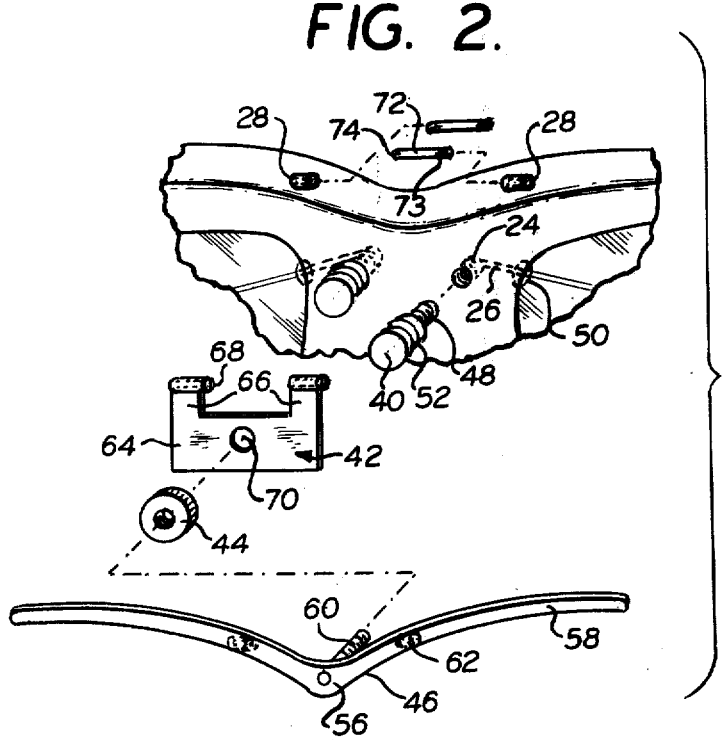
FIG. 2 is a fragmentary perspective exploded view showing the focusing means of the preferred eyeglasses in greater detail.
Figure 3:
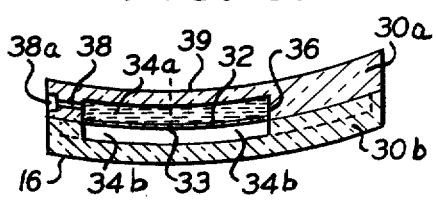
FIG. 3 is a sectional view taken along the line 3—3 in FIG. 1 showing the adjustable focus lens.

Referring now to the drawing and initially to FIGS. 1-3 thereof, the preferred biomechanically focused eyeglasses 10 according to the present invention are shown. As illustrated, the eyeglasses 10 include a frame 12 defining apertures 14 for receiving adjustable focus lenses 16 and a means 18 for adjustably controlling the focal lengths thereof. While this aperture arrangement for receiving the lenses 16 is preferred, persons skilled in the art will recognize that other lens attachment arrangements, including those of conventional metal or "rimless" frames will also serve.

As is usual, frame 12 includes a bridge 20 and temples 22 for holding the frame in place. For reasons that will be explained hereinafter, a pair of threaded blind holes 24 are provided in the upper portion of the bridge 20, the holes communicating via ducts 26 with apertures 14. A pair of internally threaded short tubular members 28 are fixedly secured to the top of frame 12 on either side of the bridge 20. Frame 12 is preferably of plastic construction, although other suitable materials and combinations thereof may be substituted. For example, metal frames or frames comprised of metal and plastic may be used. Depending upon frame material and construction, tubular members 28 will be integrally molded with frame 12 or separately formed and joined together by any of a variety of well known techniques.

As presently preferred and shown in FIG. 3, each lens 16 includes a pair of conventional fixed focus rigid lenses 30 having recessed 34, and a flexible diaphragm 32. The rigid lenses 30 may be ground from glass, plastics, or other suitable materials, while diaphragm 32 is preferably selected from the collection of water-white flexible plastics used for food wrapping, bottles, glass laminating, etc. In addition to protecting the diaphragm 32, the rigid lenses 30 may be shaped to provide fixed opthalmic correction where necessary. For example, the lenses 30 may be selected for prismatic or cylindrical correction as well as to correct myopia and hyperopia. As shown and preferred, such shaping includes the conventional profiling of the proximal optical surface 39 and, where required, compensating profiling of other optical surfaces. This profiling, which is exaggerated in the figure for clarity of illustration, is preferably effected in such a way that the diaphragm boundary of the cell is convex as shown, even when the lens is adjusted for far focus. This arrangement is preferred because the diaphragm is under tension in use, eliminating surface irregularities which would otherwise adversely affect vision in the zero curvature state, and because the diaphragm tension provides a restoring force when the brows are lifted.

As shown, the diaphragm 32 extends through the cavity defined by the recesses 34 and is secured to one or both of the rigid lenses 30 preferably in such a way that the "free" portion 33 of diaphragm 32 is concentric with the optical axis of the lens, for example, by being cemented to lens(es) 30 at interface 36. For reasons that will be more fully apparent hereinafter, each rigid lens 30a has a bore in the side wall thereof defining a duct 38 which communicates with the cavity defined by the recess 34a and the confronting surface of diaphragm 32, and a seal seat 38a.

Figure 4:
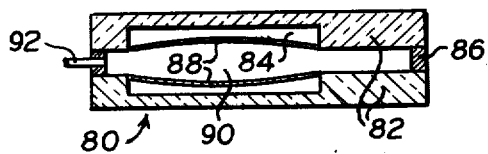
FIG. 4 is a view similar to FIG. 3 but showing an alternative lens embodiment.

Means 18 for controllably adjusting the focal lengths of the lenses 16 includes bellows 40, equalizer bar 42, thumbwheel 44 and brow lever 46. As best shown in FIG. 2, each bellows 40 preferably includes a rigid hollow externally threaded lower portion 48 of substantially smaller diameter than the pleated expandable upper portion 52. The lower portions 48 are screwed into threaded blind holes 24 in the frame 12. Communication between corresponding bellows 40 and lens ducts 38 is effected by frame ducts 26 which connect corresponding blind holes 24 with lens ducts 38. Leak-free communication between corresponding ducts is effected by conventional seals 50, typically "O" rings held captive by frame seal seats 26a and lens seal seats 38a. In alternate lens mounting arrangements where this duct-and-seal arrangement is impractical, communication between cavity 34a and bellows 40 can be effected by other means, say conduit 92 of FIG. 4, or by relocating bellows 40 on lenses 16.

As shown, brow lever 46 is preferably integrally formed, having a central portion 56 and a pair of wings 58, each of the wings 58 having a short open-ended tubular member 62 secured thereto. Brow lever 46 is desirably made of water-white thermoplastic, water-white for cosmetic reasons and thermoplastic to accommodate custom fitting. As presently preferred and shown, central portion 56 of brow lever 46 is fitted with a threaded stud 60 on which thumbwheel 44 is threadably received. The thumbwheel 44 is preferably knurled to facilitate finger control.

Equalizer bar 42 is preferably rigid and made of metal, plastic or other suitable material. As shown, the equalizer bar 42 includes a central portion 64 and a pair of upstanding leg portions 66. A short, preferably tubular member 68 is disposed on top of each leg portion 66. As shown, central portion 64 has a hole 70 extending therethrough, the hole 70 having a diameter slightly larger than stud 60 for receiving same as will be explained hereinafter.

Brow lever 46 and equalizer bar 42 are pivotably secured to the frame 12 by tubular members 62 and 68, and screw pins 72 which are threadably received and secured in tubular members 28. Pins 72 have threads 73 at their outboard ends, and screwdriver slots 74 at their inboard ends to facilitate assembly. While other securing arrangements well known to persons skilled in the art may alternately be employed, the screw pin arrangement is preferred because it is convenient for repair. As best shown in FIG. 1, when the glasses 10 are assembled, the lower portion of the equalizer bar 42 overlies the expandable upper portion 52 of the bellows 40, the stud 60 is received in the hole 70, and the thumbwheel 44 is between the brow lever 46 and the equalizer bar 42. Assembly is completed by filling the cavities 34a, bellows 40, blind holes 24, and ducts 26 and 38 with a suitable transparent fluid, preferably a liquid, and fitting the lenses 16 along with seals 50 in the apertures 14 in such a way that seals 50 are retained in their respective seats. Bubbles can be eliminated by immersing parts as necessary during assembly. Skilled art workers will appreciate that a variety of different fluids may be used. The fluid may be chosen from a wide range of pure substances and mixtures. For example, a glycerol and water mixture may be used. Moreover, while liquids are preferred, gases and even gels may be substituted. Therefore, as used throughout, the term "fluid" contemplates any such suitable substance.

It will thus be apparent that the combination of diaphragms 32 and liquid filled cavities 34a defines liquid lenses whose focal lengths may be varied by controlling the volume of liquid in the cavities and that control is effected by compressing and relaxing bellows 40. As is the case with most conventional glasses, and as presently preferred and shown in FIGS. 1 and 3, the optical axes of the lens assemblies 16 are positioned for correspondence with the pupillary position of the eye rather than the geometric center of the lens 16. Thus, the recesses 34a and the "free" portions 33 of diaphragms 32 are substantially concentric with the optical axes of the respective lenses, but offset with respect to the geometric center as shown in FIG. 3. While the arrangement of optical axes illustrated by FIG. 3 is preferred, skilled art workers will recognize that other arrangements may be effected, one such being the arrangement corresponding to conventional bifocals. Such workers will also recognize that while the required substantially spherical curvature of diaphragm portion 33 is preferably achieved by fixing the diaphragms to the rigid lens elements as explained earlier, alternate arrangements in which diaphragm 32 extends into the region of abutment between rigid elements 30 and is alternately or additionally secured there will also serve. Another option is that of making the extended portion of diaphragm 32 inflexible.

For use, thermoplastic wings 58 of the brow lever 46 are preferably custom fitted to respond to the movement of the wearer's brow. Thumbwheel 44, which controls the spacing between the brow lever 46 and the equalizer bar 42 is then rotatably adjusted to a position in which objects at some convenient distance, say 20 feet, are in sharp focus. Assume the wearer now intends to perform a task involving the near visual field, for example, reading. The wearer effects the desired change in focus by lowering the brow which causes a pivotal motion of the brow lever 46 about the pins 72. This is, in turn, transmitted by stud 60 and thumbwheel 44 to the equalizer bar 42 to compress the bellows 40, thereby increasing the volume of liquid in the cavities 34a. Clearly, this increase in volume distends the diaphragms, increasing curvatures and thereby shortening the focal lengths of the lenses. Lenses may be focused for other visual tasks merely by suitably positioning the brows, the restoring forces needed to decrease curvature and increase focal length when the brows are lifted or relaxed being derived from energy stored in the bellows and the diaphragms when the former are compressed and the latter are distended. Thus, focusing is effected by brow position. Obviously, the suggested 20 foot "rest focus" is merely a convenient starting point, and individual users may prefer other "rest" foci, or even different "rest" foci for different visual tasks.

The eyeglasses 10 of the present invention are a convenient and effective means for extending the focusing range of the eye, and as such are particularly intended for presbyopics who must now make do with glasses that blur objects beyond reading distances in at least a portion of the visual field. In fact, it is contemplated that the eyeglasses 10 will replace conventional bifocals and trifocals which rely on head tilt to accommodate viewing through different zones having fixed focal lengths. Moreover, except for the initial manual adjustment of thumbwheel 44, automatic focusing of the glasses 10 is accomplished totally without the necessity of manual contact, thus allowing the wearer to focus even when both hands are busy, dirty, gloved, etc. It is further contemplated that once the wearer gains proficiency in manipulating brow lever 46, focusing will become second nature. Moreover, where no fixed opthalmic correction is needed, only frame size, fit, and perhaps style need be varied to accommodate individual users. The advantages to the trade of such universal application (at least insofar as lenses are concerned) are obvious. Further, even in cases when fixed correction is required, lens assemblies can be considered single-focus blanks and ground accordingly.

It will also be appreciated that because adjustment of the curvature of diaphragms 32 is effected on the basis of volume displacement rather than pressure differentials, the focal lengths of both lenses, once matched, will always be substantially equal despite differences in diaphragm stiffness resulting from differences in manufacture, material, aging, etc. Matching is accommodated by the differential volume change which results when equalizer bar 42 is held fixed and bellows 40 is turned. This differential volume change results because the diameter of the threaded portion 48 of bellows 40 is smaller than the pleated portion 52. Thus, focal length is increased by increasing threaded engagement, and vice versa. Matching can also be effected by cruder means, say bending or filing equalizer bar 42. While most applications are best served by lenses 16, the adjustable parts of which match and track as one, particular applications may require lenses which differ in one or both of these respects. Since appropriate mechanisms will be obvious to persons skilled in the art once this description is known, further elaboration is deemed unnecessary.

Skilled art workers will recognize that a number of changes and modifications may be made in the biomechanically focused eyeglasses 10 according to the present invention. For example, with reference to FIG. 4, an alternate adjustable focus fluid lens 80 is shown. The lens 80 is similar to lens 16 except that a double diaphragm replaces the single diaphragm 32 illustrated in FIG. 3. Thus, lens 80 includes a pair of rigid ground and polished glass or plastic lenses 82 formed with recesses 84. Once again, the rigid lenses 82 may be shaped to correct opthalmic deficiencies, etc. The lenses 82 are preferably separated by a ring 86 comprised, for example, of plastic. For cosmetic reasons, the ring is preferably disposed adjacent the peripheries of the rigid lenses 80.

In this embodiment, a pair of diaphragms 88 extend through the space between the lenses 80 and are preferably secured to the rigid elements 82 at the peripheries of the recesses 84, say by cementing. The space between the diaphragms 88 defines a cavity 90 which communicates with a suitable volume control mechanism, say a bellows (not shown) via a conduit 92 which extends through the ring 86, or via the duct-and-seal arrangement of FIGS. 1–3. The cavity 90, conduit 92 and bellows are preferably filled with a transparent liquid such as the water and glycerol mixture mentioned above. During assembly, the cavities 84 may be filled with a dry, inert gas and sealed. Alternatively, the cavities 84 may be filled with a liquid having an index of refraction lower than that of the liquid used to fill the cavity 90, but preferably one having the same density. Of course, if a liquid is used to fill the cavities 84, provision must be made for bleeding off the liquid as the volume in the cavity 90 is varied by compressing and relaxing the bellows.

Based on the above description, it will be obvious that the lens 80 may be substituted for the lens 16 and operates in subsantially the same way. Thus, as the volume of liquid in the cavity 90 is increased by compressing the bellows, the diaphragms 88 will expand and increase the curvature of the substantially spherical sections defined thereby. Conversely, when the volume of liquid in the cavity 90 is reduced, the curvatures of the diaphragms 88 will also be reduced.

Figure 5A:
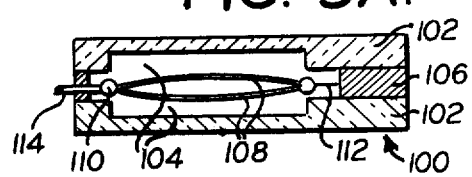
FIG. 5 is a view similar to FIG. 3 showing yet another lens embodiment.

A still further alternative lens embodiment is illustrated in FIG. 5. As shown in FIG. 5A, and like the lenses 16 and 80 depicted in FIGS. 3 and 4, the lens 100 includes a pair of ground and polished glass or plastic rigid lenses 102 which define recesses 104, and incorporate such fixed correction as may be required, including that needed to compensate for the inherent curvature of the adjustable portion. The rigid lenses 102 are separated by a ring 106, the bore of which is preferably concentric with the adjustable part. A preferably liquid filled closed elastic cell 108 is supported in tension between the lenses 102 by a plurality of preferably identical, coplanar, and equally spaced radially extending elastic strands 112 secured to the ring 106. The toroidal member 110 communicates with a suitable fluid displacement mechanism, such as a bellows (not shown), via conduit 114 which extends through ring 106, or via the duct-and-seal arrangement of FIGS. 1–3. Toroidal member 110 is attached to stands 112 and is preferably concentric with cell 108.

Figure 5B:
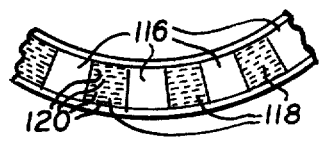

Referring now to FIG. 5B, the toroidal member 110 is comprised of a plurality of hollow cylindrical sections 116 and 118, the sections 116 being rigid, and the sections 118 being comprised of an anisotropic membrane material which, for example, may be formed from isotropic elastic material by introducing reinforcing strands 120 oriented along the axis of the tube as shown.

It will thus be apparent that as fluid is pumped into the toroidal member 110 as a result of compressing the bellows or actuating some other suitable mechanism, the sections 118 will bulge, bringing the sections 116 closer together, thus decreasing the major diameter of toroidal member 110. Since toroidal member 110 is attached to elastic strands 112, the net effect is a decrease in the flattening forces applied to cell 108 by elastic strands 112.

Under these conditions the elastic forces in the cell membrane will prevail, the cell will assume a more nearly spherical shape, and the focal length will decrease. When the bellows is relaxed, this sequence of events will reverse, and focal length will increase. Persons skilled in the art will recognize that toroidal member 110 will produce the desired effect not only when attached as described, but also when attached to or interposed between the cell and the strands, and when attached to the cell alone.

One important consequence of isolating and sealing the fluid in the cell of lens 100 is elimination of the visual distortion resulting from turbulence caused by ingress and egress of fluid during focusing. An additional benefit results from the smaller volume of fluid displaced to effect a given change in focal length. Since the volume of fluid displaced is smaller, the mechanical advantage of the focusing system can be increased and the focusing effort reduced. These benefits are lost when toroidal member 110 is omitted and focusing is effected by controlling cell fluid volume by means familar from previous embodiments herein. While the embodiment of FIG. 5 is optically superior, FIG. 3 embodiments are preferred where cost and cosmetic considerations prevail.

Of course, any variable focus lens suitable for biomechanical control may be employed. Thus, for example, while flexible membranes are preferably sandwiched between rigid lens elements both for protection and to effect fixed opthalmic correction, alternate arrangements will also serve. For example, referring to the lens embodiment illustrated in FIG. 4, the rigid lens elements 80 may be eliminated and the peripheries of the diaphragms 88 secured directly to the frame 12. In fact, it is even contemplated that rigid "zoom" lenses may be used. Furthermore, while the variable focus portions of the lenses are offset from the geometric center of the rigid lens elements in accordance with the trend toward lenses having non-circular contours and offset optical centers, this too is a matter of preference. It is also obvious that the lenses may be tinted or colored conventionally as by staining the rigid lens elements, or by coloring the refracting fluid, the membrane, or both. As a further refinement, adjustable focus lenses whose axes converge as the focal length decreases may be used. Such an arrangement is preferred for close work because it facilitates comfortable binocular viewing at extremely short range.

Of course, whenever a fluid lens embodiment is employed, the refracting fluid must be compatible with all contacted parts. Further, the transition temperatures of the fluid should be outside the range of ambients to which the glasses will be exposed, and the fluid should be physiologically inert to avoid injury to eyes or skin. Thus, while water is physiologically inert, it freezes at temperatures in the expected ambient range, and the water and glycerol mixtures mentioned above is suitable because the addition of glycerol depresses the freezing point of the mixture below anticipated ambient temperatures.

Skilled art workers will recognize that the number of substances and mixtures which may be employed is virtually limitless. On this basis, the index of refraction of the fluid medium may be selected as desired. Somewhat similar freedom exists with respect to rigid structural and optical elements, and this freedom accommodates material selection such that internal lens parts are invisible at one particular focus and unobstrusive otherwise. Using FIG. 3 as example, duct 38 is rendered invisible by matching color and index of refraction of the fluid in cavity 34a to that of rigid lens element 30a, and this matching also renders cavity 34a invisible when the curvature of the "free" portion 33 of diaphragm 32 matches that of the adjacent face of rigid element 30a. Where cosmetic considerations are paramount, cavity 34b is extended to the dotted boundaries and the boundary portions at the edge of the lenses are hidden behind the frame. While this arrangement is cosmetically superior, the original boundaries of cavity 34b are preferred because membrane 32 is additionally secured as desired thereby. Similar treatment can be applied to the embodiment of FIG. 4, and all that is required here is the filling of cavities 84 with fluids whose colors and indices match those of the adjacent rigid elements 82. (If these matching fluids are incompressible it is obvious that some other volume changing arrangement, such as additional bellows communicating with cavities 84, will be required.) If, say for demonstration purposes, lens components are to be made obvious, indices and colors can be intentionally mismatched.

The embodiment of FIG. 5 can be similarly modified, but here the task is more difficult because of the additional parts. Worse, the cell boundary will still be visible because the fluid therein must be different from that outside.

Returning to FIG. 3, cosmetic considerations clearly explain why the capability for correction of myopia and hyperopia inherent in the adjustable focus element, and obvious to persons skilled in the art was ignored, and why such correction was incorporated into the rigid elements instead.

Furthermore, while the preferred focusing means 18 is responsive to brow movement, other mechanisms responsive to other muscular actions may be used. Also possible is the use of externally powered focusing mechanisms responsive to nerve or muscle signals generated by suitable voluntary anatomical actions. The only limitations here are voluntary anatomical actions which do not involve the use of hands, since focus effected on this basis is, as noted above, impractical. Thus, as used herein, the term "non-manual voluntary anatomical action" is used to describe those anatomical actions suitable for actuating the focusing mechanism. Since the construction of such other focusing mechanisms will be apparent to those skilled in the art once this description is known, further description is deemed unnecessary.

Where the preferred brow actuation is retained, brow lever 46 can alternately be pivoted about a different axis, or arranged for translation rather than rotation. Further modifications include a "pump and bleed" arrangement in which each lowering of the brows shortens the focal length by some arbitrary increment. In such arrangements, the focal length change persists until some voluntary action, say lifting the brows above the rest position, activates a bleed valve which increases the focal length at some arbitrary rate, preferably one proportional to brow lift. This arrangement has the advantage of reducing brow fatigue when a particular focus must be maintained for an extended period of time because brow muscles are used to effect a change in focal length, not to maintain it. Further refinements include springs interposed between the equalizer bar and the frame or as part of the bellows and introduced to augment or offset the restoring forces mentioned earlier, and tapered bellows or other arrangements intended to increase or decrease the sensitivity of focus to brow movement at particular portions of the focusing range.

Since these and other changes and modifications are within the scope of the present invention, the above description should be construed as illustrative and not in the limiting sense, the scope of the invention being defined by the following claims.

What is claimed is:

1. In biomechanically focused eyeglasses for facial wear of the type comprising a frame, an adjustable focus lens, means for securing the lens to the frame, and means for adjusting the focus of the lens, wherein the improvement comprises:

hands-free means for actuating said adjusting means in response to the movement of a voluntary muscle, said hands-free means being substantially independent of head tilt and eye position.

2. The biomechanically focused eyeglasses according to claim 1, wherein said actuating means comprises means for actuating said adjusting means in response to brow movement.

3. The biomechanically focused eyeglasses according to claim 1, wherein said adjustable focus lens comprises a transparent cell having an elastic surface and a transparent fluid disposed in the cell; and said adjusting means comprises means for varying the curvature of the elastic surface.

4. The biomechanically focused eyeglasses according to claim 3, wherein said means for varying the curvature of the elastic surface of the lens comprises means for controlling the volume of fluid in the cell.

5. The biomechanically focused eyeglasses according to claim 3, and further comprising a rigid fixed focus lens, said elastic surface of said lens cell being secured to said rigid lens; and wherein said means for securing said adjustable focus lens to said frame comprises means for securing said rigid lens to said frame.

6. The biomechanically focused eyeglasses according to claim 1, wherein said adjustable focus lens comprises a transparent elastic cell and a transparent fluid disposed in the cell;

said means for securing the lens to the frame comprises means fixed with respect to the frame for supporting the cell in tension;

said adjusting means comprises a radially resilient toroidal member having a fluid disposed therein, means communicating with the toroidal member for controlling the volume of fluid therein for varying the diameter thereof and means for securing the toroidal member to said supporting means whereby varying the diameter of the toroidal member will vary the tension imparted to the cell by the supporting means thereby changing the curvature of the cell.

7. In biomechanically focused eyeglasses of the type comprising: a frame; a pair of adjustable focus lenses, said lenses each including a transparent cell having an elastic surface and a transparent fluid disposed in the cell; means for securing the lenses to the frames; means for controlling the volume of fluid in the cells for varying the curvature of the elastic surfaces for adjusting the focus of the lenses; and means for actuating the fluid volume controlling means; wherein the improvement comprises:

said fluid volume controlling means comprising a pair of bellows, each communicating with one of the cells and operable in response to an applied force; and a bar operatively connected to the actuating means and mounted to the frame in overlying relation with the bellows for movement relative thereto, movement of the bar effecting substantially equal displacement of the bellows for effecting substantially equal fluid volume changes in each of said cells.

8. The biomechanically focused eyeglasses according to claim 7, wherein said actuating means is responsive to a non-manual anatomical action.

9. The biomechanically focused eyeglasses according to claim 8, wherein said non-manual voluntary anatomical action is brow movement; and said actuating means comprises a lever disposed adjacent the brow and mounted to the frame for movement relative to the bar for effecting movement thereof in response to brow movement.

10. The biomechanically focused eyeglasses according to claim 8, and further comprising means for adjusting the rest position of the lever relative to the bar.

11. In an adjustable focus lens of the type comprising a transparent elastic cell and a fluid disposed in the cell, the improvement which comprises:

means for supporting the cell in tension;

a radially resilient toroidal member having a fluid disposed therein;

means communicating with the toroidal member for controlling the volume of fluid therein for varying the diameter thereof; and means for securing said toroidal member to said supporting means whereby varying the diameter of the toroidal member will vary the tension imparted to the cell by the supporting means thereby changing the curvature of the cell.

* * * * *